March 6, 1973     D. M. NEECE     3,719,234
HIGH SPEED SHIELD CULTIVATOR LEVELER
Filed Feb. 25, 1971     2 Sheets-Sheet 1
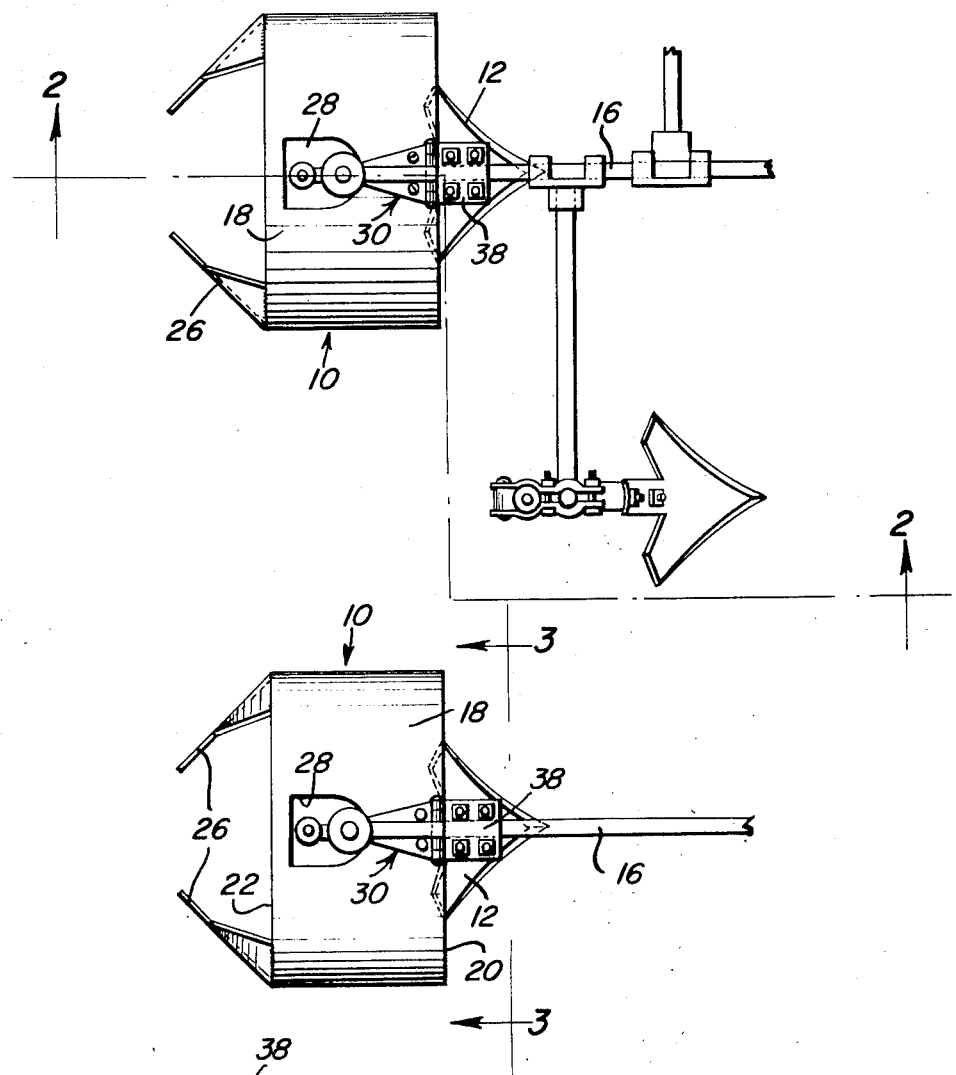
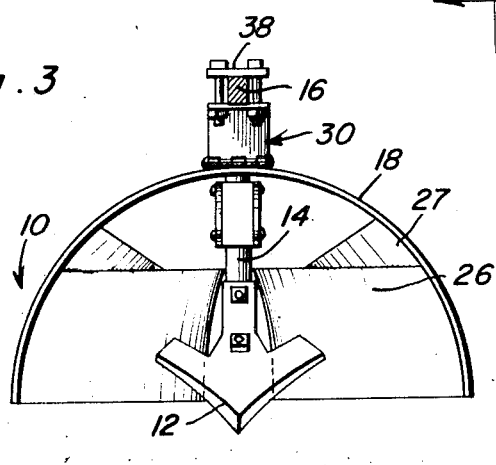
Delbert M. Neece
INVENTOR.
BY Clarence A. O'Brien
and Harvey B. Jacobson
Attorneys March 6, 1973 D. M. NEECE 3,719,234
HIGH SPEED SHIELD CULTIVATOR LEVELER
Filed Feb. 25, 1971 2 Sheets-Sheet 2
Fig. 2
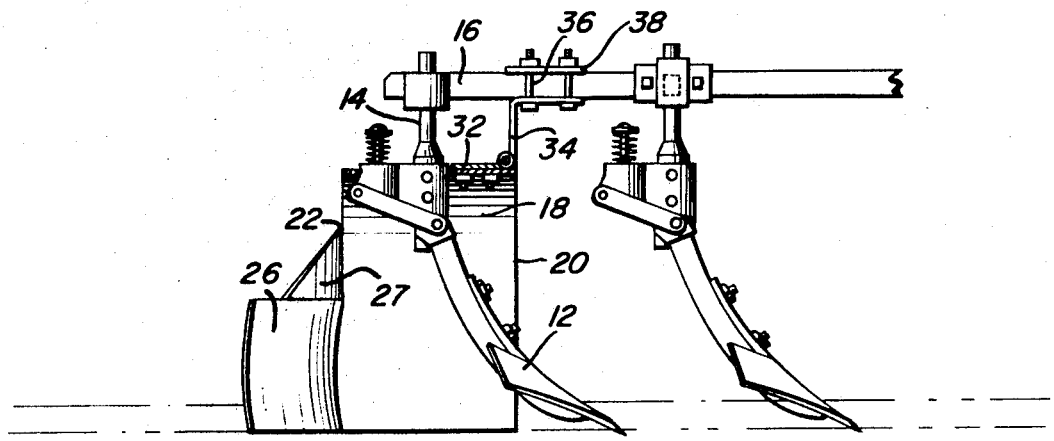
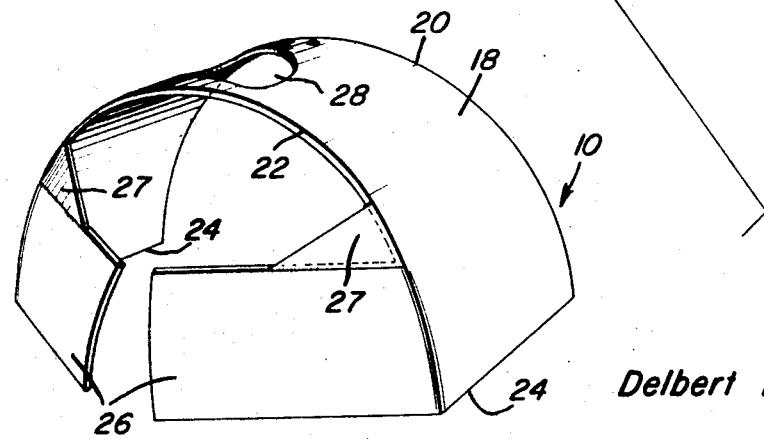
Fig. 4
Delbert M. Neece
INVENTOR

United States Patent Office 3,719,234
Patented Mar. 6, 1973

3,719,234
HIGH SPEED SHIELD CULTIVATOR LEVELER
Delbert M. Neece, 517 Jackson St.,
Gardner, Ill. 60424
Filed Feb. 25, 1971, Ser. No. 118,610
Int. Cl. A01b 35/32
U.S. Cl. 172—135                                    1 Claim

ABSTRACT OF THE DISCLOSURE

A ground leveler for use in association with a cultivator shovel which is pulled forwardly through the ground. The leveler is an inverted U-shaped housing having generally parallel spaced apart ground engaging side skirts flanking the sides of the cultivator shovel. The housing has a top bridging the side skirts and the leveler is hingedly mounted at the top of its forward end. Rearwardly and inwardly inclined wings constitute extensions of each of the side skirts. The terminal ends of the wing extensions are spaced apart at the centrally located path of the cultivator shovel. The leveler causes dirt erupted by the cultivator shovel to be confined to the general path of travel of the shovel and the ground relevelled.

---

The present invention generally relates to cultivator shovels, and is more particularly concerned with a unique leveler which mounts in operative position about a shovel so as to cooperate therewith in receiving the dirt therefrom and both leveling and retaining the dirt against excess lateral overflow on the rows to the sides of the shovel.

Objects of the instant invention include the provision of a leveler which, while highly unique, is structurally simple, economical to manufacture, easily mounted and removed as desired, and highly efficient in performing its intended functions.

The leveler is in the nature of an upright arcuate shield defined by a generally semi-circularly configured metal sheet having parallel forward and rear arcuate edges. The rear edge, at the opposite ends thereof, is provided with a pair of rearwardly and inwardly inclined wings, orientated at approximately 45 degrees. The apex of the shield has an enlarged shank accommodating hole therethrough, the hole being sufficiently larger than the shovel shank so as to enable a slight vertical pivotal adjustment of the leveler. The forward portion of the leveler is inturn hingedly mounted to the shovel mounting main beam.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view of a portion of a shovel carrying cultivator illustrating the leveler of the present invention mounted in conjunction with selected ones of the shovels;

FIG. 2 is an enlarged cross-sectional view taken substantially upon a plane passing along section line 2—2 in FIG. 1;

FIG. 3 is an enlarged cross-sectional view taken substantially upon a plane passing along line 3—3 in FIG. 1; and FIG. 4 is an exploded perspective view of the leveler and mounting components thereof.

Referring now more specifically to the drawings, reference numeral 10 is used to generally designate the leveler comprising the instant invention. This leveler is to be used in conjunction with a conventional cultivator shovel 12 mounted through an upright shank 14 on an overlying main beam 16 in a manner so as to trail immediately therebehind and effect a general leveling and confining of the dirt so as to prevent an excess overflow thereof. As suggested in FIG. 1, the leveler can be mounted on all or selected ones of the shovels as desired.

The leveler 10 includes a housing or body portion 18 formed in a generally inverted U-shape. The housing has an arcuate or semi-circular sheet of material provided with parallel semi-circular front and rear edges 20 and 22. The opposed ends 24 of the body forming sheet are flat, parallel and extend transversely between the front and rear arcuate edges 20 and 22. The ends 24 constitute generally parallel ground engaging side skirts which flank the cultivator shovel 12. The skirts are spaced slightly outwardly of the side of the cultivator shovel and act to confine the dirt erupted by the shovel to the general path of travel of the shovel. The top of the semi-circular housing constitutes a bridge connecting the side skirts 24.

Projecting rearwardly and inwardly from the rear edge 22 of the body 18 and constituting extensions of the side skirts 24 is a pair of dirt deflecting and leveling wings 26. These wings 26 are of a height, commencing at the lower ends of the opposed sides of the body 18, equal to approximately half the total height of the arcuate body 18 and extend rearwardly and inwardly at approximately a 45 degree angle, terminating in laterally spaced apart rear or trailing ends. It will be appreciated that these wings 26 are so orientated and spaced apart at the central path of travel of the shovel so as to perform the desired leveling and retaining function while at the same time not adversely affecting the furrow formed by the shovel 12. Incidentally, as indicated in the drawings, the wings 26 can, if so desired, be slightly arcuate so as to follow the general curvature of the shield body 18. Further, gusset-like reinforcing plates 27 can be utilized between the wings 26 and rear edge 22 of the body.

In order to mount and properly locate the leveler 10, the central upper or apex portion of the arcuate body 18 is provided with an enlarged opening 28 therethrough which freely receives the shovel mounting shank 14 and the additional components which spring load the shovel and engage the shovel with the shank. Positioned in this manner, noting FIGS. 1 and 2 in particular, it willl be appreciated that the shield body 18 is positioned to form a housing over and around the shovel 12.

The actual securing of the shield 10 is effected by means of a hinge 30. The hinge includes a first leaf 32 secured to the upper skirt bridging portion of the sheet like body 18 immediately forward of the enlarged opening 28 and a second right angularly formed leaf 34 which in the mounted position of the leveler 10, projects vertically relative to the overlying main beam 16 and then forwardly therebeneath for the reception of elongated mounting bolts 36. These mounting bolts 36 extend through the main beam underlying portion of the hinge leaf 34 and through a main beam overlying cooperating plate 38 appropriate nuts being associated with the bolts 36 whereby a fixed clamping of the hinge leaf 34 to the tool bar 16 is effected. This mounting hinge 30 located generally at the top and forward end of the housing 18 in conjunction with the enlarged shank receiving opening 28, enables a floating movement of the leveler whereby the desired leveling action is achieved while at the same time allowing for an escape of any excess build-up of dirt within the leveler by the swinging of the leveler upwardly about its forwardly disposed top hinge so as to prevent a clogging of the leveler.

From the foregoing, it will be appreciated that a highly unique leveler for use in conjunction with a cultivator shovel has been defined. The leveler is simple although highly unique, easily mounted and efficient in operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A leveler for use in association with a beam and shank supported cultivator shovel which is pulled forwardly through the ground, comprising a support mounted on and depending from said beam, a housing, said housing having generally parallel spaced apart side skirts flanking the sides of the cultivator shovel and spaced slightly outwardly therefrom, said skirts extending substantially down to the ground line, a top bridging the side skirts, and having an opening at the top for reception of the shank of the cultivator shovel, means hingedly mounting the forward end of the top to said support, and rearwardly and inwardly inclined wings joined to the rearward end of each of side side skirts, the terminal ends of said wings spaced apart at the centrally located path of the cultivator shovel, whereby dirt erupted by the cultivator shovel is confined to the general path of travel of the shovel by the side skirts of the leveler and is pulled inwardly from both sides back toward the shovel path by the rearwardly and inwardly inclined trailing wings and whereby the hinge mounting of the leveler permits the rearward ends of the side skirts and the wings to float generally vertically and whereby the combination of actions relevels the ground after eruption by the cultivator shovel.

References Cited

UNITED STATES PATENTS

| | | | |
|---|---|---|---|
| 3,331,449 | 7/1967 | Blocker | 172—159 |
| 2,672,718 | 3/1954 | Thomas | 172—112 X |
| 3,155,169 | 11/1964 | Mattson et al. | 172—512 |
| 2,657,620 | 11/1953 | Meeks | 172—112 |
| 1,691,352 | 11/1928 | Hicks | 172—112 X |
| 3,542,133 | 11/1970 | Van Der Lely | 172—112 X |

ROBERT E. PULFREY, Primary Examiner

STEPHEN C. PELLEGRINO, Assistant Examiner

U.S. Cl. X.R.

172—512, 748; 16—135